United States Patent
Yang

(10) Patent No.: US 7,420,813 B2
(45) Date of Patent: Sep. 2, 2008

(54) FASTENING STRUCTURE FOR STACKING ELECTRIC MODULES

(75) Inventor: Chu-Hsin Yang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/675,825

(22) Filed: Feb. 16, 2007

(65) Prior Publication Data
US 2008/0137311 A1  Jun. 12, 2008

(30) Foreign Application Priority Data
Dec. 7, 2006  (TW) ............................ 95145598 A

(51) Int. Cl.
*H05K 5/00* (2006.01)
(52) U.S. Cl. .................. 361/732; 361/683; 361/785; 361/747; 361/801; 361/803
(58) Field of Classification Search ............... 361/732, 361/683–686, 785, 789, 803, 740, 747, 759, 361/801; 439/327, 64, 155, 371
See application file for complete search history.

(56) References Cited

U.S. PATENT DOCUMENTS

| | | | | |
|---|---|---|---|---|
| 1,816,671 A | * | 7/1931 | Davidson ..................... | 40/652 |
| 3,577,113 A | * | 5/1971 | Maitland ..................... | 439/64 |
| 4,684,030 A | * | 8/1987 | Gurzynski ............... | 211/88.01 |
| 4,815,611 A | * | 3/1989 | Gurzynski et al. ....... | 211/88.01 |
| 4,879,705 A | * | 11/1989 | Aoyagi et al. ............. | 369/30.14 |
| 5,157,590 A | * | 10/1992 | Barthel et al. ............... | 361/825 |
| 5,216,582 A | * | 6/1993 | Russell et al. ............... | 361/685 |
| 5,687,856 A | * | 11/1997 | Kendrena ................... | 211/70.6 |
| 6,361,343 B1 | * | 3/2002 | Daskalakis et al. .......... | 439/327 |
| 2001/0027996 A1 | * | 10/2001 | Smith et al. .................. | 235/440 |
| 2003/0058614 A1 | * | 3/2003 | Na et al. ...................... | 361/686 |
| 2006/0065611 A1 | * | 3/2006 | Blateri ........................ | 211/55 |
| 2006/0256532 A1 | * | 11/2006 | He et al. ...................... | 361/719 |

* cited by examiner

*Primary Examiner*—Dean A. Reichard
*Assistant Examiner*—Xiaoliang Chen
(74) *Attorney, Agent, or Firm*—J.C. Patents

(57) ABSTRACT

A fastening structure for stacking a plurality of electronic modules on a mainboard is provided. The fastening structure includes a locking member and a plurality of supporting members. The locking member is disposed on a first electronic module for locking the first electronic module onto the mainboard by locking elements. The supporting members are connected to the locking member and are used to carry a second electronic module above the first electronic module. Therefore, under a limited space for disposing the first/second electronic modules, the fastening structure of the present invention increases the space utilization, thereby enhancing the strength of the structure for the first/second electronic modules.

2 Claims, 3 Drawing Sheets

FASTENING STRUCTURE FOR STACKING ELECTRIC MODULES

CROSS-REFERENCE TO RELATED APPLICATION

This application claims the priority benefit of Taiwan application Ser. No. 95145598, filed Dec. 7, 2006. All disclosure of the Taiwan application is incorporated herein by reference.

BACKGROUND OF THE INVENTION

1. Field of the Invention

The present invention relates to a fastening structure, and more particularly to a fastening structure for stacking a plurality of electronic modules on a mainboard.

2. Description of Related Art

In recent years, Double Data-Rate Synchronous Dynamic Random Access Memory (DDR S-DRAM) having the advantages of low power consumption, high durability, and high reading/writing speed, has been widely applied in electronic products such as notebooks, workstations, servers, routers, and switchers. In order to fix the DDR memory module on the mainboard, a plurality of memory connectors is disposed on the mainboard to electrically connect the DDR memory module to the central processing unit (CPU). Generally speaking, the memory connectors have a slot and a plurality of resilient terminals, and the DDR memory module can be inserted into the slot and electrically connected to the resilient terminals, and the memory connectors further fix the DDR memory module in the slot through a latch, so as to prevent the DDR memory module from falling off.

However, as the space within the electronic product is limited and the surface of the mainboard is also occupied by other electronic parts, there is no additional space available for disposing another set of memory modules. Therefore, the configuration of the memory modules must be adjusted and the memory modules can be fixed in the slots under a stable structure without falling off.

SUMMARY OF THE INVENTION

The present invention is directed to providing a fastening structure for stacking a plurality of electronic modules, so as to accommodate more electronic modules in a limited space.

The present invention is directed to providing a fastening structure for stacking a plurality of electronic modules applicable for a mainboard. The fastening structure comprises a locking member and a plurality of supporting members. The locking member is disposed on a first electronic module for locking the first electronic module on the mainboard. The supporting members are connected to the locking member for carrying a second electronic module over the first electronic module.

In an embodiment of the present invention, the locking member has a plurality of through holes, and correspondingly the first electronic module has a plurality of coordination holes. Through locking elements passing through the through holes and the coordination holes, the locking member and the first electronic module are fixed on the mainboard.

In an embodiment of the present invention, each of the supporting members has a retaining portion and a pressing portion. The second electronic module is disposed on the retaining portion, and the pressing portion is pressed on the second electronic module, so as to prevent the second electronic module from falling off.

The present invention provides a fastening structure for stacking a plurality of electronic modules applicable for a mainboard. The mainboard has a plurality of connectors electrically connected to the electronic modules. The fastening structure of the present invention comprises a locking member, a plurality of locking elements, a plurality of supporting members, a plurality of retaining members, and at least one pressing member. The locking member is disposed on the first electronic module and has a plurality of through holes, and the first electronic module has a plurality of coordination holes corresponding to the through holes. The locking elements respectively pass through the through holes and the retaining holes for fixing the locking member and the first electronic module on the mainboard. The supporting members are connected to the locking members for carrying the second electronic module above the first electronic module. In addition, the retaining members are connected to the supporting member, and the second electronic module is disposed on the retaining members. The pressing member is connected to the supporting member, and pressed on the second electronic module.

The present invention utilizes the fastening structure for stacking a plurality of electronic modules to increase the space utilization, and meanwhile prevent the electronic modules from falling off when being shaken.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
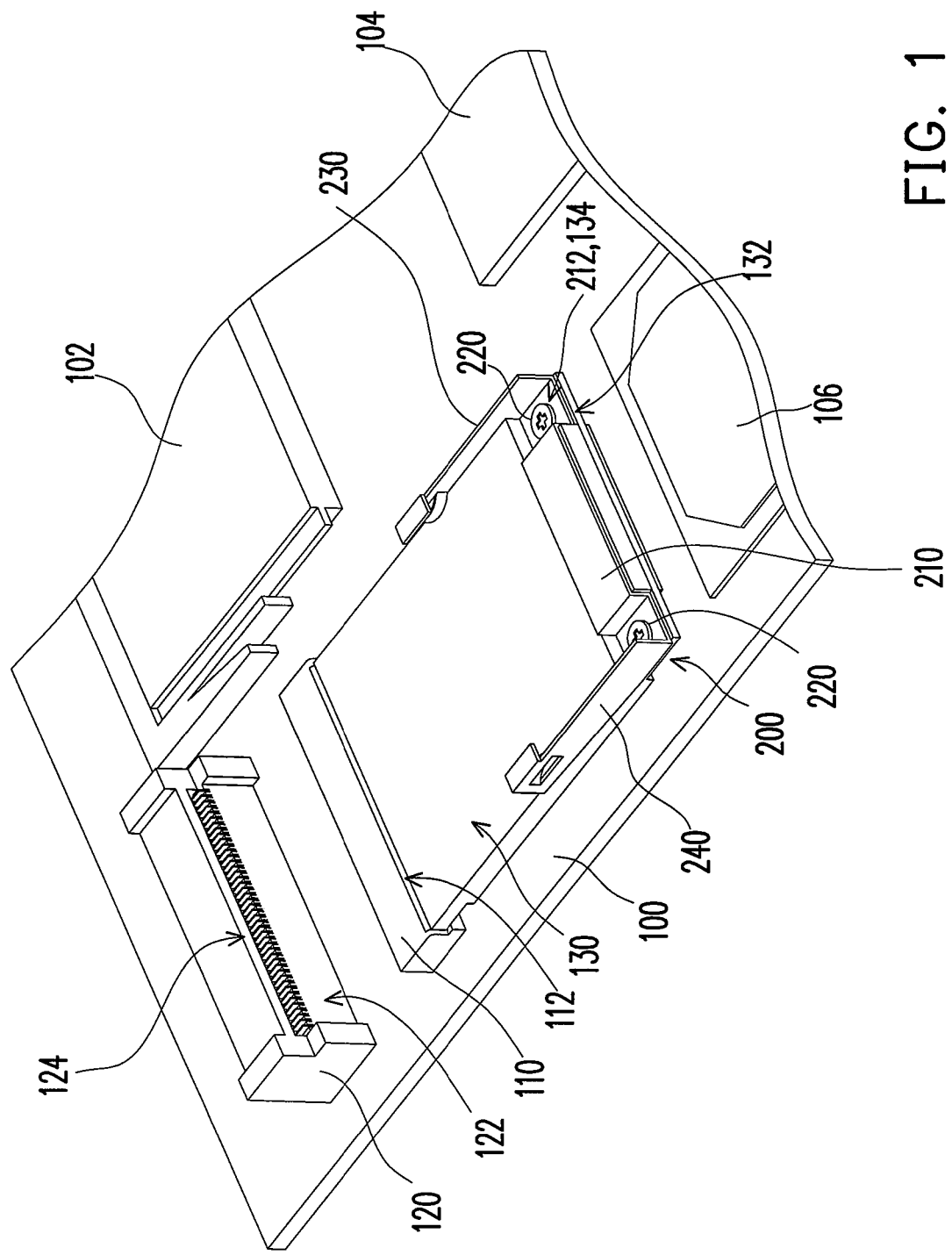
FIG. 1 is a schematic view of the configuration of a first electronic module according to an embodiment of the present invention.
Figure 2:
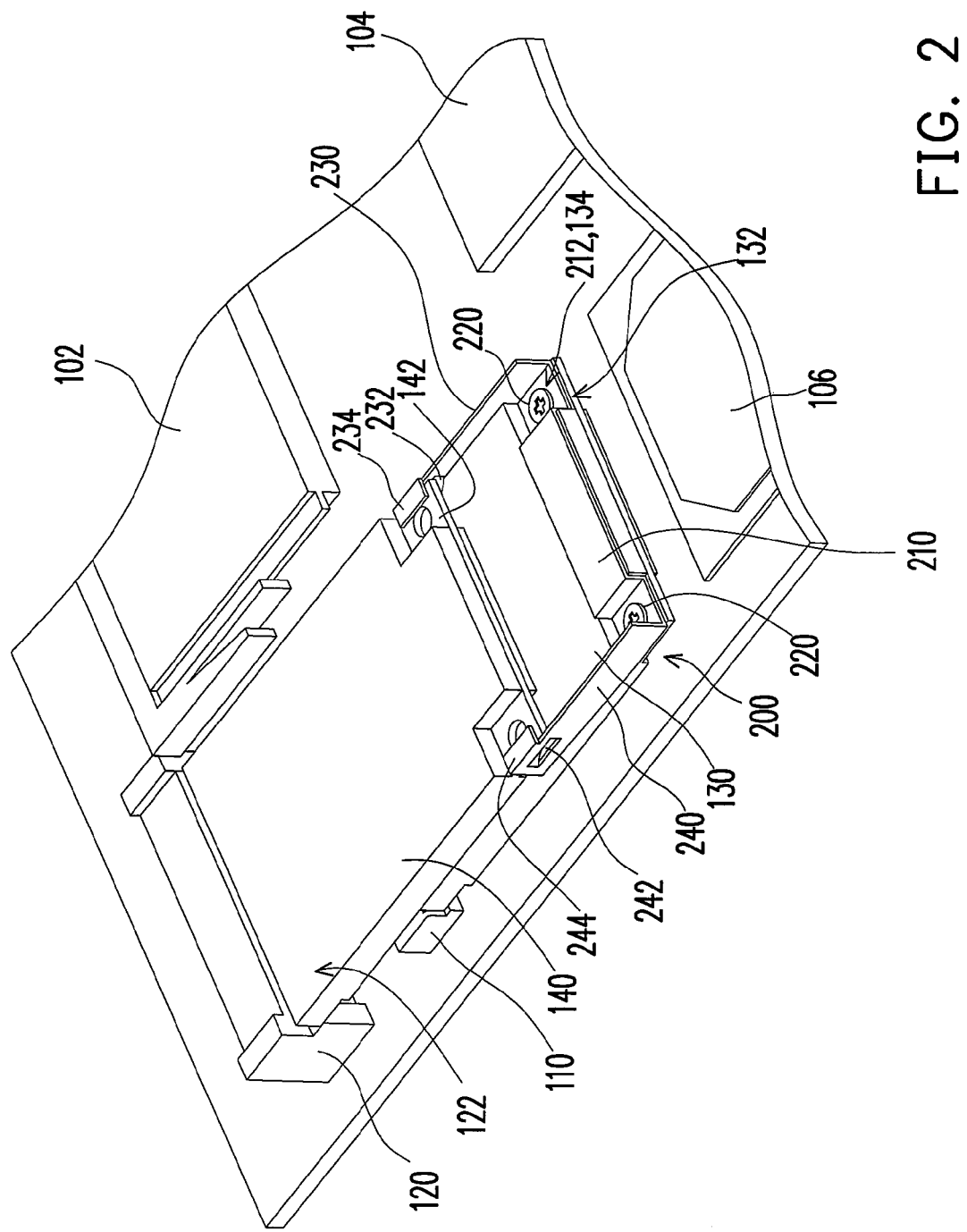
FIG. 2 is a schematic view of the configuration of a first/second electronic module and a fastening structure.
Figure 3:
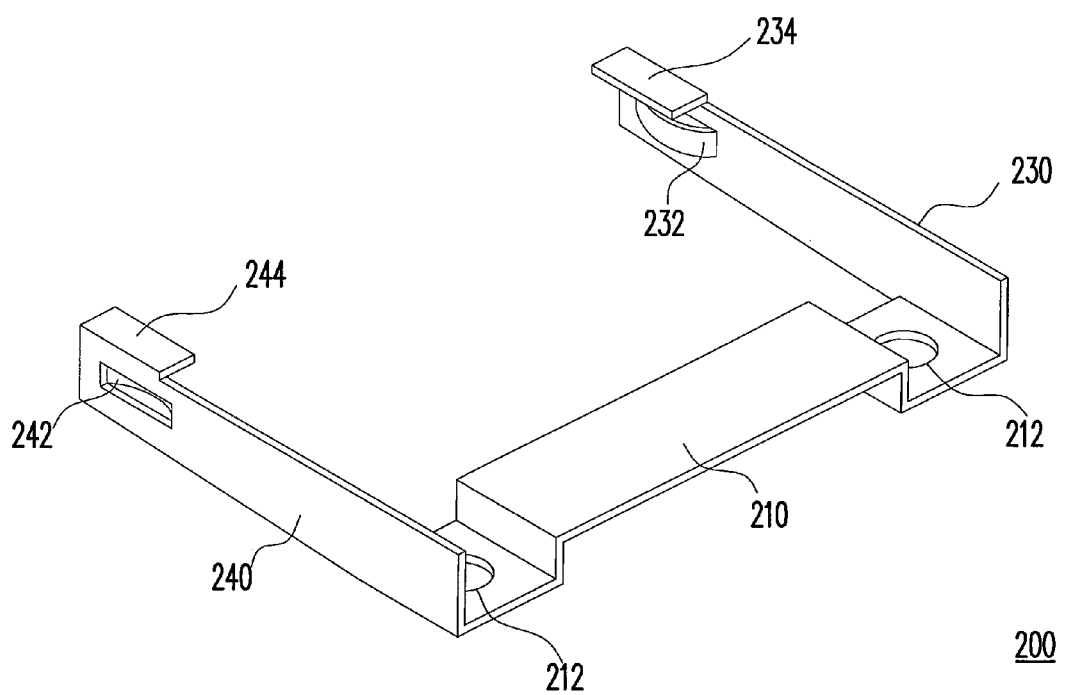
FIG. 3 is a schematic view of a fastening structure according to an embodiment of the present invention.

FIG. 1 is a schematic view of the configuration of a first electronic module and a fastening structure according to an embodiment of the present invention, FIG. 2 is a schematic view of the configuration of a first/second electronic module and the fastening structure. FIG. 3 is a schematic view of the fastening structure according to an embodiment of the present invention. It should be noted that two electronic modules are taken as an example for illustration in this embodiment, but the present invention is not limited to this, and those skilled in the art may use more than two electronic modules as well. Furthermore, for the convenience of illustration, the memory module is taken as an example of the electronic module, but the display unit module, driving module, or any other expansion module also fall within the scope of the present invention.

Referring to FIG. 1 and FIG. 2, a first connector 110 and a second connector 120 are disposed on the mainboard 100, the first connector 110 is electrically connected to the first electronic module 130, and the second connector 120 is electrically connected to the second electronic module 140. The first connector 110 has a slot 112 and a plurality of resilient terminals (not shown), such that the first electronic module 130 may be inserted into the slot 112 and electrically connected to the resilient terminals. Furthermore, the second connector 120 also has a slot 122 and a plurality of resilient terminals 124, such that the second electronic module 140 may be inserted into the 122 and electrically connected to the resilient terminals 124. The first and second electronic modules 130, 140 have similar structures, for example, a memory module, such as DDR DRAM module or S-DRAM module, formed by a circuit board and a plurality of memories arranged thereon.

As various electronic components 102, 104, and 106 have already distributed on the mainboard 100, in order to effectively utilize the space of the mainboard 100, the first connector 110 and the second connector 120 are not arranged side by side, but sequentially arranged back and forth, and the slot 112 of the first connector 110 and the slot 122 of the second connector 120 has a height difference, that is, the height of the slot 122 for the second connector 120 is higher than that of the slot 112 of the first connector 110, such that the first/second electronic modules 130, 140 may be stacked on the mainboard 100. In order to make the first/second electronic modules 130, 140 stably stacked on the mainboard 100 and maintaining a good electrical connection to the first/second connectors 110, 120, the present invention provides a fastening structure 200 for stacking a plurality of electronic modules, so as to satisfy the designing requirements.

Referring to FIGS. 1 and 3, when the first electronic module 130 is inserted into the slot 112 of the first connector 110, the fastening structure 200 of the present invention is disposed on the first electronic module 130. The fastening structure 200 has a locking member 210 and a plurality of locking elements 220, and the locking member 210 is bent into a predetermined shape. Under a preferred circumstance, coordination holes 134 are formed on the circuit board 132 of the first electronic module 130, and the locking member 210 is disposed with two through holes 212 corresponding to the coordination holes 134. The locking element (e.g., screw) 220 may pass through the through holes 212 and the coordination holes 134, thereby being fixed at the nut (not shown), such that the first electronic module 130 is fixed between the locking member 210 and the mainboard 100. Although the screw as the locking element 220 can be used to achieve a preferred locking force. Those of ordinary skill in the art may utilize engaging, latching, or another positioning mechanisms for implementation.

Furthermore, the fastening structure 200 of the present invention further has two supporting members 230, 240, which are bent into a predetermined shape and connected to the locking member 210. Under a preferred circumstance, the locking member 210 and the two supporting members 230, 240 are integrally made of the same metal plate. However, other bonding processes may also be used for integration. The two supporting members 230, 240 may be used to carry the second electronic module 140 above the first electronic module 130. Referring to FIG. 2, when the second electronic module 140 is inserted into the slot 122 of the second connector 120, the retaining portions 232, 242 are respectively extended from the supporting members 230, 240 corresponding to the lower edge of the circuit board 142 of the second electronic module 140, which are used as the retaining members for carrying the second electronic module 140. The retaining portions 232, 242 are formed by punching a portion of the surface of the supporting members 230, 240, or welded and fixed on the supporting members 230, 240 by another element.

In addition, pressing portions 234, 244 are extended from the supporting members 230, 240 corresponding to the upper edge of the circuit board 142 of the second electronic module 140, and are used as a pressing member. Therefore, when the fastening structure 200 of the present invention is locked on the mainboard 100, the pressing portions 234, 244 are pressed on the second electronic module 140 stably, thus preventing the second electronic module 140 and the second connector 120 from falling off. In addition to being processed with the same metal plate, the pressing members 234, 244 may also be welded and fixed on the supporting members 230, 240 by another element which may be one or more.

The present invention may utilize different elements to fabricate the locking element, the supporting members, the retaining portions, and the pressing portions of the fastening structure. Under the preferred circumstance, the locking member, the through holes, the supporting members, the retaining portions, and the pressing portions are fabricated through the most simplified process in this embodiment so as to save the material cost, and also provide a structure with the optimal design and sufficient strength for fixing the first/second electronic modules. Therefore, under the configuration with limited space, the fastening structure of the present invention can easily stack the second electronic module on the first electronic module, thereby making efficient use of the space within the electronic device.

To sum up, the fastening structure of the present invention includes one locking element and two supporting members, the locking member is disposed on the first electronic module and locks the first electronic module on the mainboard. In addition, the two supporting members respectively have a retaining portion and a pressing portion for carrying the second electronic module above the first electronic module. The retaining portion and the pressing portion are correspondingly extended to two surfaces of the second electronic module for fixing and pressing the second electronic module, thereby preventing the second electronic module and the second connector from falling off. Therefore, the present invention can enhance the strength of the structure of the first/second electronic modules.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fastening structure for stacking a plurality of electronic moduleson a mainboard, wherein the mainboard has a plurality of connectors electrically connected to a plurality of electronic modules, the fastening structure comprising:

a locking member, disposed on a first electronic module, and having a plurality of through holes, wherein the first electronic module has a plurality of coordination holes corresponding to the through holes;

a plurality of locking elements, passing through the through holes and the coordination holes respectively, thus fixing the locking member and the first electronic module on the mainboard;

a plurality of supporting members, connected to the locking member, for carrying a second electronic module above the first electronic module;

a plurality of retaining members, connected to the supporting member, and disposed on the retaining members; and at least one pressing member, connected to the supporting member, and pressed on the second electronic module.

2. The fastening structure as claimed in claim 1, wherein the locking member, the supporting members, the retaining members, and at least one pressing member are integrally made of a metal plate.

* * * * *